(12) United States Patent
Ejiri et al.

(10) Patent No.: US 12,328,375 B2
(45) Date of Patent: Jun. 10, 2025

(54) OPERATION SUPPORT APPARATUS, OPERATION SUPPORT SYSTEM AND OPERATION SUPPORT METHOD

(71) Applicant: NEC Corporation, Tokyo (JP)

(72) Inventors: Takeshi Ejiri, Tokyo (JP); Nozomu Takama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/418,450

(22) Filed: Jan. 22, 2024

(65) Prior Publication Data
US 2024/0259481 A1    Aug. 1, 2024

(30) Foreign Application Priority Data

Jan. 31, 2023 (JP) .................................. 2023-013236

(51) Int. Cl.
*H04L 67/63* (2022.01)
*H04L 41/08* (2022.01)
*H04W 24/02* (2009.01)

(52) U.S. Cl.
CPC .............. *H04L 67/63* (2022.05); *H04L 41/08* (2013.01); *H04W 24/02* (2013.01)

(58) Field of Classification Search
CPC ........ H04L 67/63; H04L 41/08; H04W 24/02; H04W 28/0221; H04W 28/00; H04W 52/0203
See application file for complete search history.

(56) References Cited

U.S. PATENT DOCUMENTS

| | | | |
|---|---|---|---|
| 9,516,600 B1* | 12/2016 | Nama | H04W 52/50 |
| 2012/0095734 A1* | 4/2012 | Moll | G06F 17/11 703/2 |
| 2016/0262163 A1* | 9/2016 | Gonzalez Garrido | H04W 16/10 |
| 2017/0353991 A1 | 12/2017 | Tapia | |
| 2019/0141543 A1* | 5/2019 | Ganapathi | H04W 24/08 |
| 2021/0004229 A1* | 1/2021 | Benisty | G06F 9/3004 |
| 2021/0006481 A1* | 1/2021 | Gao | H04L 41/0681 |
| 2021/0255902 A1* | 8/2021 | Soon-Shiong | G06F 9/5027 |
| 2023/0276261 A1* | 8/2023 | Manolakos | H04W 24/10 370/328 |
| 2023/0419219 A1* | 12/2023 | Hotta | G06Q 10/0633 |
| 2024/0259481 A1* | 8/2024 | Ejiri | H04L 67/63 |

FOREIGN PATENT DOCUMENTS

| | | |
|---|---|---|
| JP | 2010-178243 A | 8/2010 |
| JP | 2019-009490 A | 1/2019 |
| JP | 2019-521427 A | 7/2019 |

* cited by examiner

*Primary Examiner* — David R Lazaro
(74) *Attorney, Agent, or Firm* — Sughrue Mion, PLLC (57) ABSTRACT

Even in a case where conflicting requests are issued from apparatuses that belong to a domain, each of the apparatus are appropriately controlled. An operation support apparatus includes an reception unit which receives a plurality of requests from one or more apparatuses among a plurality of apparatuses that constitute a RAN, a TN and a CN and that operate according to an automated closed loop control method; and a control unit which (i) generates, from content of the plurality of requests, respective vectors each constituted by predetermined indices, and performs an operation on the vectors, and (ii) controls the plurality of apparatuses on the basis of a vector obtained by performing the operation.

15 Claims, 6 Drawing Sheets

| PRIORITY LEVEL | CONTENT | REMARKS |
|---|---|---|
| 5 | DISASTERS | INSTRUCTIONS RELATED TO SERVICES FOR EMERGENCIES SUCH AS EARTHQUAKES, TSUNAMIS, FLOODS, WARFARE, AND OTHER EXTRAORDINARY NATURAL PHENOMENA |
| 4 | HUMAN LIFE PRIORITY/ EMERGENCY CARE | INSTRUCTIONS RELATED TO SERVICES ASSOCIATED WITH INDIVIDUAL HUMAN LIVES, FOR EXAMPLE, EMERGENCY CARE, POLICE, AND SEARCH, ETC. |
| 3 | PUBLIC EVENTS/VIP'S VISIT | INSTRUCTIONS RELATED TO ELECTIONS, ACTIONS FOR VIP'S VISIT FROM OVERSEAS, ETC. |
| 2 | WORKS | INSTRUCTIONS RELATED TO WORKS SUCH AS FILE UPDATING IN COMPANY |
| 1 | ACTIONS FOR EFFICIENCY IMPROVEMENT/CIVIC EVENTS | INSTRUCTIONS RELATED TO PRIVATE EVENTS OR CIVIC EVENTS, SUCH AS CONCERTS AND FIREWORKS SHOWS, AND INSTRUCTIONS RELATED TO ENERGY CONSERVATION ACTIVITIES SUCH AS ENERGY SAVING |

OPERATION SUPPORT APPARATUS, OPERATION SUPPORT SYSTEM AND OPERATION SUPPORT METHOD

This Nonprovisional application claims priority under 35 U.S.C. § 119 on Patent Application No. 2023-013236 filed in Japan on Jan. 31, 2023, the entire contents of which are hereby incorporated by reference.

TECHNICAL FIELD

The present invention relates to an operation support apparatus, an operation support system and an operation support method.

BACKGROUND ART

In core networks such as the fourth generation mobile communication system (4G) and the fifth generation mobile communication system (5G) and radio access networks (RANs), apparatus design, accommodation, and fault countermeasures are manually or semi-automatically arranged in each domain (e.g., RAN domain, and transmission domain). It is predicted that in the future, in accordance with progress of automation in each domain by an end to end (E2E) orchestrator, a massive amount of automatic processing will be carried out simultaneously. As a technique related to this, there is an invention disclosed in Patent Literature 1 below.

Patent Literature 1 discloses that a decision processing unit decides which bands are to be allocated to a service A provided by a server A and to a service B provided by a server B, according to KPI values stored in a KPI measurement result storage unit and on the basis of present NW band information.

CITATION LIST

Patent Literature

[Patent Literature 1]
Japanese Patent Application Publication Tokukai No. 2010-178243

SUMMARY OF INVENTION

Technical Problem

Due to an autonomous operation at each domain, a conflict (conflicting instructions) may occur due to processes that are not interrelated with each other. For example, there may be a case where at the same time as a stop request is issued according to an energy saving instruction to an apparatus that belongs to a specific domain, a disaster occurs and a scale-out request is issued to the apparatus in response to a sudden increase in packet processing load in the domain. In this way, there may occur a problem that processes of conflicting instructions directed to one apparatus are carried out. However, even when the invention disclosed in the above-described Patent Literature 1 is used, such a problem cannot be solved.

An example aspect of the present invention is attained in view of the above problem. An example object of an example aspect of the present invention is to provide a technique that, even in a case where conflicting requests are issued from apparatuses that belong to a domain, makes it possible to appropriately control each of the apparatuses.

Solution to Problem

An operation support apparatus according to an example aspect of the present invention is an operation support apparatus which supports operations of a plurality of apparatuses that constitute a domain of a network and that operate according to an automated closed loop control method, the operation support apparatus including at least one processor, the at least one processor carrying out: a process of receiving a plurality of requests from one or more apparatuses among the plurality of apparatuses; and a process of (i) generating, from content of the plurality of requests, respective vectors each constituted by predetermined indices, and performing an operation on the vectors, and (ii) controlling the plurality of apparatuses on the basis of a vector obtained by performing the operation.

An operation support system according to an example aspect of the present invention is an operation support system including: a plurality of apparatuses which constitute a domain of a network and which operate according to an automated closed loop control method; and an operation support apparatus which supports the plurality of apparatuses, the operation support apparatus including at least one processor, the at least one processor carrying out: a process of receiving a plurality of requests from one or more apparatuses among the plurality of apparatuses; and a process of (i) generating, from content of the plurality of requests, respective vectors each constituted by predetermined indices, and performing an operation on the vectors, and (ii) controlling the plurality of apparatuses on the basis of a vector obtained by performing the operation.

An operation support method according to an example aspect of the present invention is an operation support method for supporting operations of a plurality of apparatuses which constitute a domain of a network and which operate according to an automated closed loop control method, the operation support method including: receiving a plurality of requests from one or more apparatuses among the plurality of apparatuses; generating, from content of the plurality of requests, respective vectors each constituted by predetermined indices, and performing an operation on the vectors; and controlling the plurality of apparatuses on the basis of a vector obtained by performing the operation.

Advantageous Effects of Invention

According to an example aspect of the present invention, even in a case where conflicting requests are issued from apparatuses that belong to a domain, it is possible to appropriately control each of the apparatuses.

DESCRIPTION OF EMBODIMENTS

First Example Embodiment

<Operation Support Apparatus 1 According to First Example Embodiment>

A first example embodiment of the present invention will be described in detail with reference to the drawings. The present example embodiment is an embodiment serving as a basis for example embodiments described later. Note that the drawing reference numerals noted in this general description are provided, merely for convenience, to respective elements as examples for easy understanding, and are not intended to limit the example aspects of the present invention to those illustrated in the drawings. Further, a connection line between blocks in the drawings to be referred to in the description below indicates both two-way and one-way directions. A one-way arrow schematically indicates a flow of a main signal (data) and does not exclude bidirectionality. In addition, at an input/output connection point of each block in the drawings may be configured to be provided with a port or an interface, but illustration of such configurations are omitted.

Figure 1:
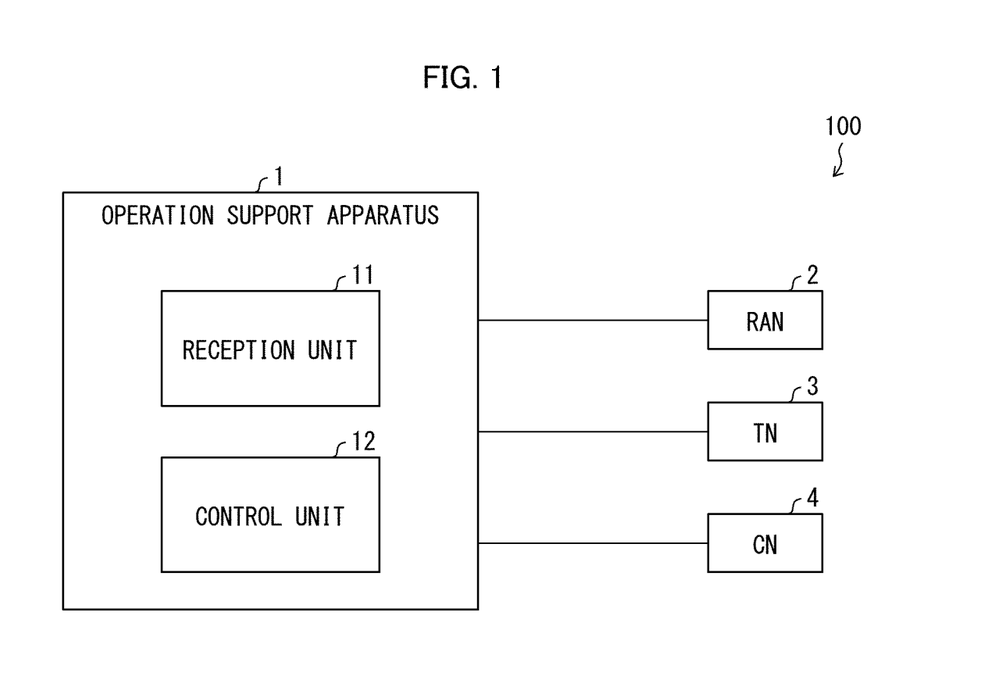
FIG. 1 is a block diagram illustrating a configuration example of an operation support apparatus in accordance with a first example embodiment of the present invention.

FIG. 1 is a block diagram illustrating a configuration example of an operation support system 100 that includes an operation support apparatus 1 in accordance with a first example embodiment of the present invention. The operation support system 100 in accordance with the present example embodiment includes the operation support apparatus 1, a RAN 2, a transport network (TN) 3, and a core network (CN) 4. In the following description, RAN is also referred to as "wireless access network", TN is also referred to as "transport network", and CN is referred to as "core network".

The operation support apparatus 1 supports operations of a plurality of apparatuses that constitute a domain of a network and that operate according to an automated closed loop control method.

The network has domains that include respective domains of the RAN 2, the TN 3 and the CN 4. Further, the domains of the network may further include another domain other than the above domains, for example, a PRIVATE5G domain.

The wireless access network 2 is constituted by, for example, a base station of the fifth generation mobile communication system (5G) or the fourth generation mobile communication system (4G). The 5G and the 4G are each specified by the third generation mobile communication system partnership project (3GPP). The wireless access network 2 is located between the core network 4 and a mobile terminal and carries out, for example, control of a wireless layer. Note that the plurality of apparatuses constituting the wireless access network 2 are collectively referred to as "RAN domain".

The transport network 3 connects the wireless access network 2 and the core network 4 with each other, and connects apparatuses in each network. Note that the plurality of apparatuses constituting the transport network 3 are collectively referred to as "TN domain".

The core network 4 is constituted by, for example, a packet transfer apparatus and a system subscriber management apparatus. The mobile terminal communicates with the core network 4 via the wireless access network 2. Note that the plurality of apparatuses constituting the core network 4 are collectively referred to as "CN domain".

An automated closed loop refers to, for example, an automated operation in which no human operation intervenes (e.g., an operation in which an abnormality in a system is detected, the content of the abnormality is analyzed, and an action on the system is automatically taken). Each of the plurality of apparatuses constituting the wireless access network, the transport network, and the core network operate according to the automated closed loop control method.

It should be noted that: the present specification discusses a case where each of the plurality of the apparatuses constituting the domains of the wireless access network, the transport network, and the core network operates according to the automated closed loop control method; but an example embodiment of the present invention can be applied to a case where each of a plurality of apparatuses constituting a system that further includes a domain other than the above domains, for example, a PRIVATE5G domain, operates according to the automated closed loop control method.

In addition, it is possible to apply an example embodiment of the present invention to a case where each of the plurality of apparatuses constituting one of domains of the network, for example, the RAN domain, operates according to the automated closed loop control method. In this case, even when conflicting requests (conflict) occur in a single domain among the domains, the conflict can be resolved.

The operation support apparatus 1 includes a reception unit 11 and a control unit 12. The reception unit 11 receives a plurality of requests from one or more of the plurality of apparatuses. Examples of the plurality of requests include: a stop request which an apparatus that belongs to a specific domain issues according to an energy saving instruction; and a scale-out request which is issued in a case where a disaster occurs and a packet processing load in the domain suddenly increases. The plurality of requests may be issued by a single domain (single apparatus) or may be issued by a plurality of domains (a plurality of apparatuses).

The control unit 12 generates, from content of the plurality of requests, respective vectors each constituted by predetermined indices and performs an operation on the vectors, and controls the plurality of apparatuses on the basis of a vector obtained by performing the operation.

In a case where the predetermined indices are, for example, communication speed and electric power consumption, the control unit 12 generates vectors constituted by the communication speed and the electric power consumption from the content of the requests. For example, in a case where increasing the communication speed is needed because of an event or the like and there is a request for increasing the communication speed by 20 Mbyte/sec, the control unit 12 generates a first vector that leads to an increase in the communication speed and to an increase in the electric power consumption.

Further, in a case where there is a request related to energy saving, the control unit 12 generates a second vector that leads to a decrease in the communication speed and to a decrease in the electric power consumption. Further, the control unit 12 performs an operation on (adds up) the first vector and the second vector, and controls the plurality of apparatuses on the basis of a vector thus obtained by performing the operation.

Note that the above description has discussed, as one example of the vectors, a two-dimensional vector constituted by the communication speed and the electric power consumption, but the vectors do not necessarily need to be two-dimensional but can be in a multi-dimension including three or higher dimensions. Further, the vectors each may be a one-dimensional scalar. For example, the vectors each may be a three-dimensional vector constituted by the communication speed, the electric power consumption, and in addition cost, or be a four-dimensional vector constituted additionally with the number of claims.

<Example Advantage of Operation Support Apparatus 1>

As described above, according to the operation support apparatus 1 in accordance with the present example embodiment, the control unit 12 generates, from the content of the plurality of requests, respective vectors each constituted by predetermined indices and performs an operation on the vectors, and controls the plurality of apparatuses on the basis of a vector obtained by performing the operation. Therefore, even in a case where conflicting requests are issued from a plurality of apparatuses that operate according to the automated closed loop control method (i.e., a conflict occurs), the control unit 12 can appropriately control each of the apparatuses.

<Flow of Method of Processing by Operation Support Apparatus 1>

Figure 2:
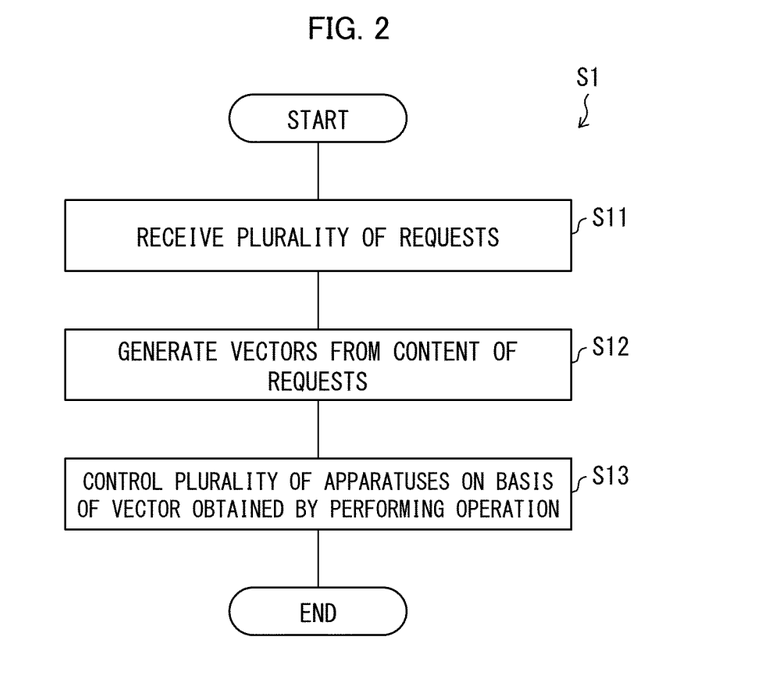
FIG. 2 is a flow chart showing a flow of a method of processing in the operation support apparatus in accordance with the first example embodiment of the present invention.

The following will describe, with reference to FIG. 2, a flow of a method of processing that is carried out by the operation support apparatus 1 configured as described above. FIG. 2 is a flow chart showing the flow of the method of the processing in the operation support apparatus 1 in accordance with the first example embodiment. As shown in FIG. 2, a processing method S1 includes Steps S11 to S13.

First, the reception unit 11 of the operation support apparatus 1 receives a plurality of requests from one or more of the plurality of apparatuses (S11). Examples of the plurality of requests include: a stop request which an apparatus that belongs to a specific domain issues according to an energy saving instruction; and a scale-out request which is issued in a case where a disaster occurs and a packet processing load in the domain suddenly increases.

Next, the control unit 12 generates, from content of the plurality of requests, vectors each constituted by predetermined indices, and performs an operation on the vectors (S12). In a case where the predetermined indices are, for example, communication speed and electric power consumption, the control unit 12 generates vectors constituted by the communication speed and the electric power consumption from the content of the requests.

Finally, the control unit 12 controls the plurality of apparatuses on the basis of a vector obtained by performing the operation (S13).

<Example Advantage of Operation Support Method>

As described above, according to the operation support method in accordance with the present example embodiment, the vectors each constituted by the predetermined indices are generated from the content of the plurality of requests, and an operation on the vectors is performed. Then, control of the plurality of apparatuses is carried out on the basis of the vector obtained by performing the operation. Therefore, even in a case where conflicting requests are issued from a plurality of apparatuses that operate according to the automated closed loop control method (i.e., a conflict occurs), it is possible to appropriately control each of the apparatuses.

Second Example Embodiment

<Configuration Example of Operation Support Apparatus 1A According to Second Example Embodiment>

Figure 3:
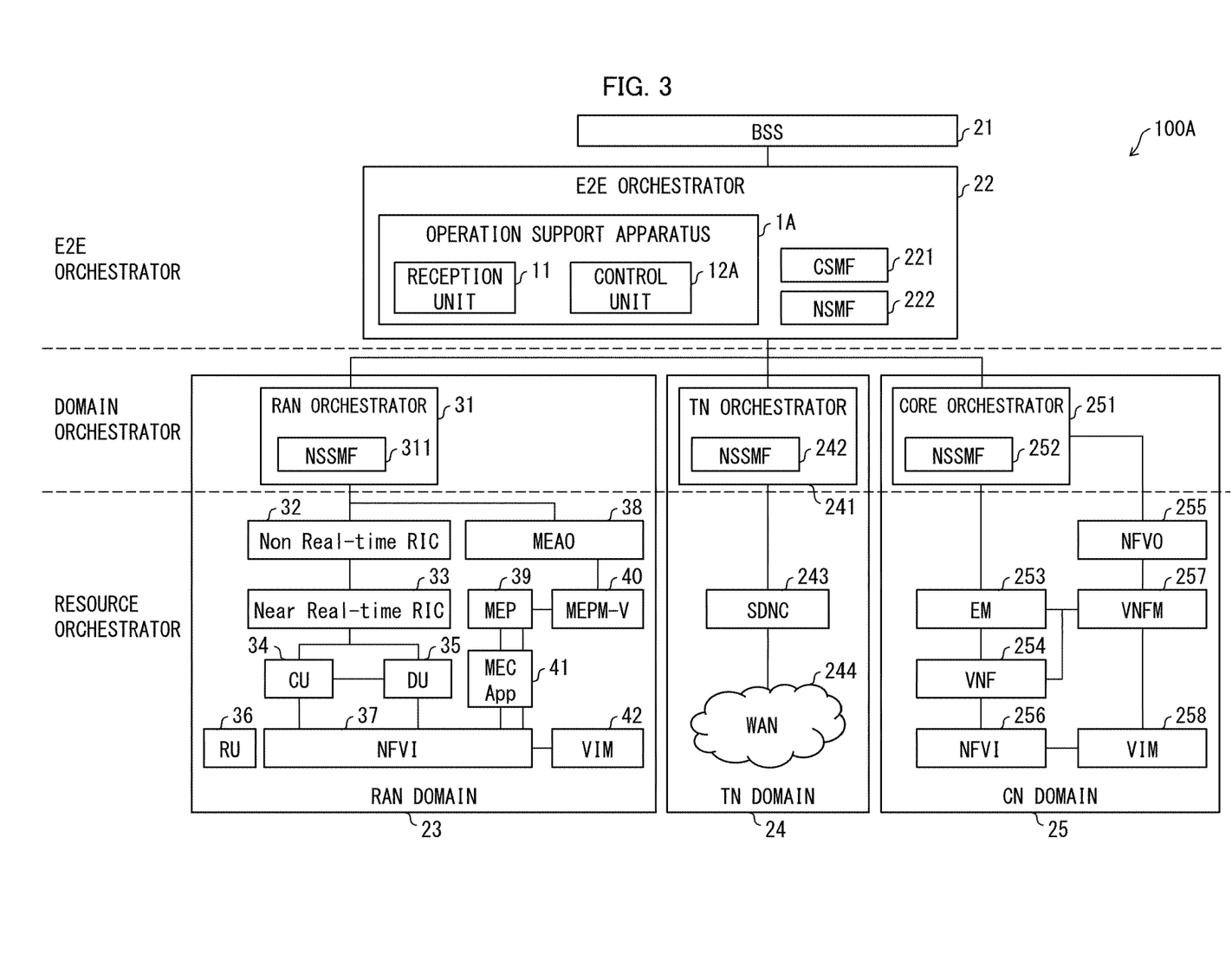
FIG. 3 is a block diagram illustrating a configuration example of an operation support system in accordance with a second example embodiment of the present invention.

FIG. 3 is a block diagram illustrating a configuration example of an operation support system 100A that includes an operation support apparatus 1A in accordance with a second example embodiment of the present invention. The operation support system 100A according to the present example embodiment is configured to comprehensively manage an entire region by an orchestrator having a three-layer structure, that is, an E2E-domain-resource structure. Further, the operation support system 100A includes a business support system (BSS) 21, an E2E orchestrator 22, a RAN domain 23, a TN domain 24, and a CN domain 25.

The BSS 21 is a generic term for business support systems for communication providers. The E2E orchestrator 22 is a part that monitors and manages capacity of a network slice, authentication, a service level agreement (SLA), and health monitoring. The E2E orchestrator 22 includes the operation support apparatus 1A according to the present example embodiment, and a communication service management function (CSMF) 221 and a network slice management function (NSMF) 222.

In order to manage communication services, the CSMF 221 uses management services that are provided by another management function (MF). The NSMF 222 not only provides a management service for a network slice instance (NSI) but also uses another management service.

Network slicing is a virtualization technique in which a single physical network is divided into a plurality of logical networks (slices) according to different service request conditions and used. A logical network that dynamically allocates network bands and computing resource is called a network slice.

Resources that are necessary for each of domains of the wireless access network, the transport network, and the core network are allocated to each of slices. An E2E network slice refers to resources assigned to each domain of the wireless access network, the transport network, and the core network.

The RAN domain 23 includes a RAN orchestrator 31, a non real-time RIC 32, a near real-time RIC 33, a central unit (CU) 34, a distributed unit (DU) 35, a radio unit (RU) 36, a network functions virtualization infrastructure (NFVI) 37, a mobile edge application orchestrator (MEAO) 38, an MEC platform (MEP) 39, a virtualized MEC platform manager (MEPM-V) 40, an MEC application (MEC App) 41, and a virtualized infrastructure manager (VIM) 42.

The RAN orchestrator 31 is a part that monitors and manages a whole of the RAN domain 23 and includes a network slice subnet management function (NSSMF) 311. The NSSMF 311 not only provides a management service for a network slice subnets instance (NSSI) but also uses another management service.

In RAN network slicing, a RAN intelligent controller (RIC) that is defined by O-RAN Alliance is provided as a component for policy application and real-time control. The RIC has an artificial intelligence/machine learning (AI/ML)-based intelligent function.

The non real-time RIC 32 performs generation and notification of a policy related to RAN control and transfer of information to the near real-time RIC 33. The near real-time RIC 33 carries out slice optimization on the basis of real-time monitoring and control of RAN data.

The RAN is constituted by a remote radio head (RRH) unit which carries out processing for a radio frequency (RF) and a base band unit (BBU) which carries out processing for a frequency other than the radio frequency (RF). The RAN is generally configured such that a function of the BBU unit is provided in the CU 34 and in the DU 35 and such that a function of the RRH unit is provided in the RU 36.

The NFVI 37 is constituted by a hardware component and a software component, and provides infrastructure resources for deployment of a VNF. The VNF is a virtual network function group that operates on the NFVI 37. The VIM 42 controls and manages computing, storage, and network resources of the NFVI 37.

The MEAO 38, the MEP 39 and the MEPM-V 40 carry out, for example, monitoring and management of the MEC application 41.

The TN domain 24 is a part that provides a slicing function for each of differing transport network parts of Front-haul, Mid-haul, and Back-haul, and includes a TN orchestrator 241, a software-defined networking controller (SDNC) 243, and a wide area network (WAN) 244.

The TN orchestrator 241 is a part that manages and controls resources for slicing the TN domain 24 and that also carries out optimization of calculation of a multilayer path. The TN orchestrator 241 includes an NSSMF 242. The NSSMF 242 not only provides a management services for the NSSI but also uses another management service.

The SDNC 243 intensively controls network apparatuses and flexibly and dynamically changes a network configuration, settings, and the like.

The CN domain 25 includes a core orchestrator 251, an element manager (EM) 253, the virtual network function (VNF) 254, an NFV orchestrator (NFVO) 255, an NFV infrastructure (NFVI) 256, a virtual network function manager (VNFM) 257, and a virtualized infrastructure manager (VIM) 258.

The core orchestrator 251 is a part that monitors and manages a whole of the CN domain 25. The core orchestrator 251 includes an NSSMF 252. The NSSMF 252 not only provides a management service for the NSSI but also uses another management service.

The EM 253 has functions of FCAPS management and life cycle management of the VNF 254 and a physical network function (PNF). Note that the FCAPS refers to fault management (Fault), configuration management (Configuration), accounting management (Accounting), performance management (Performance), and security management (Security).

The VNF 254 is a virtualized network function group that operates on the NFVI 256. The NFVO 255 carries out integrated operation management of an entire system by performing (i) lifecycle management (generation, management, operation, deletion, etc.) of a network service that is constituted by a plurality of VNFs 254, (ii) overall resource management, and (iii) verification and authorization of a resource request to the NFVI 256.

The NFVI 256 is constituted by a hardware component and a software component, and provides infrastructure resources for deployment of the VNF 254. The VNFM 257 manages resource requirements which the VNF 254 is in need of, and also manages the lifecycle of the VNF 254. The VIM 258 controls and manages computing, storage, and network resources of the NFVI 256.

In the operation support system 100A configured in this way, the plurality of apparatuses constituting the RAN domain 23, the TN domain 24, and the CN domain 25 operate according to the automated closed loop control method. Therefore, control of the network slice for each domain is carried out independently in each domain. In this case, a request that occurs in each domain is issued to the operation support apparatus 1A.

The operation support apparatus 1A in accordance with the present example embodiment includes a reception unit 11 and a control unit 12A. Note that the same reference numerals are given to respective constituent elements which have the same configurations and functions as those described of the operation support apparatus 1 described in the first example embodiment, and detailed descriptions thereof will not be repeated.

The control unit 12A (a) determines respective priority levels of the plurality of requests on the basis of the content of the plurality of requests and a plurality of predetermined priority levels, and (b) in a case where the priority levels of the plurality of requests are identical to each other, controls the plurality of apparatuses on the basis of a vector obtained by performing an operation.

Figure 4:
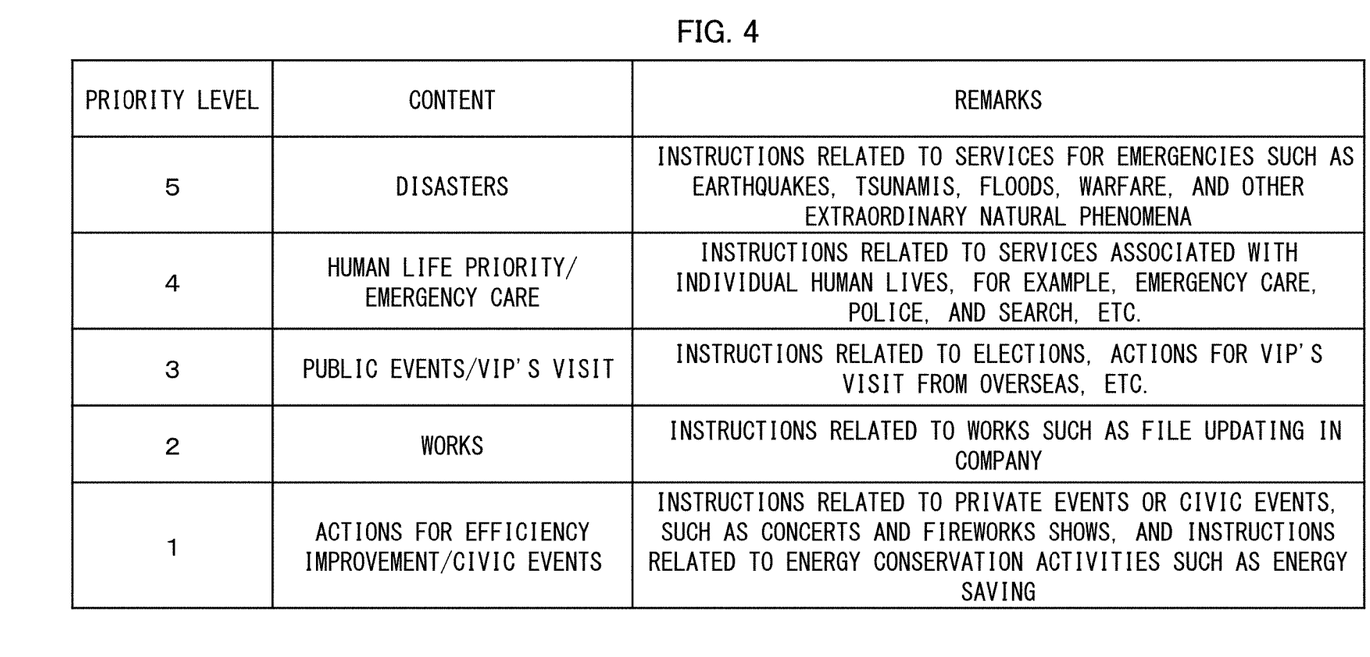
FIG. 4 is a diagram illustrating an example of priority levels of requests.

FIG. 4 is a diagram illustrating an example of the priority levels of requests. In FIG. 4, priority level "5" indicates the highest priority and priority level "1" indicates the lowest priority. The priority level "5" corresponds to the content of requests related to disasters, and includes, for example, instructions related to services for emergencies in cases of earthquakes, tsunamis, floods, warfare, and other extraordinary natural phenomena. In the event of a disaster, a domain orchestrator once releases assignment of slices to general consumers. Then, preset slices are allocated to respective parties, such as local governments, police, hospitals, and presses, that are preliminarily expected to be in need of slices in the event of the disaster. Therefore, the communication speed increases and at the same time, the electric power consumption increases.

Priority level "4" corresponds to content of requests related to human life priority and emergency care, and includes, for example, instructions related to services associated with individual human lives, for example, emergency care, police, and search. Priority level "3" corresponds to content of requests related to public events/VIP's visit, and includes instructions related to, for example, elections and actions for VIP's visit from overseas.

Priority level "2" corresponds to content of requests related to works, and includes an instruction related to works such as file updating in a company. Priority level "1" corresponds to content of requests on actions for efficiency improvement and civic events. The priority level "1" includes, for example, instructions related to private events and civic events, such as concerts and fireworks show, and energy conservation activities such as energy saving. Note that the priority varies depending on operations. Accordingly, the number of levels of the priority may be other than five. The number of priority levels necessary for an operation should be set.

The control unit 12A analyzes the content of the plurality of requests and determines which one of the plurality of requests corresponds to which one of the priority levels (priority) illustrated in FIG. 4. Then, the control unit 12A extracts only requests whose priority levels are high. In a case where there are a plurality of requests whose priority levels are the highest, the control unit 12A controls the plurality of apparatuses on the basis of a vector obtained by performing an operation.

At this time, the control unit 12A controls the plurality of apparatuses on the basis of a vector which is obtained by performing vectorization of key performance indicators (KPIs) of the plurality of requests and addition of vectors obtained by the vectorization.

For example, in a case where content of a first request and content of a second request are conflicting with each other, the control unit 12A generates a first vector from the content of the first request, generates a second vector from the content of the second request, adds up the first vector and the second vector, and controls the plurality of apparatuses on the basis of a vector obtained by adding up the first vector and the second vector.

Figure 5:
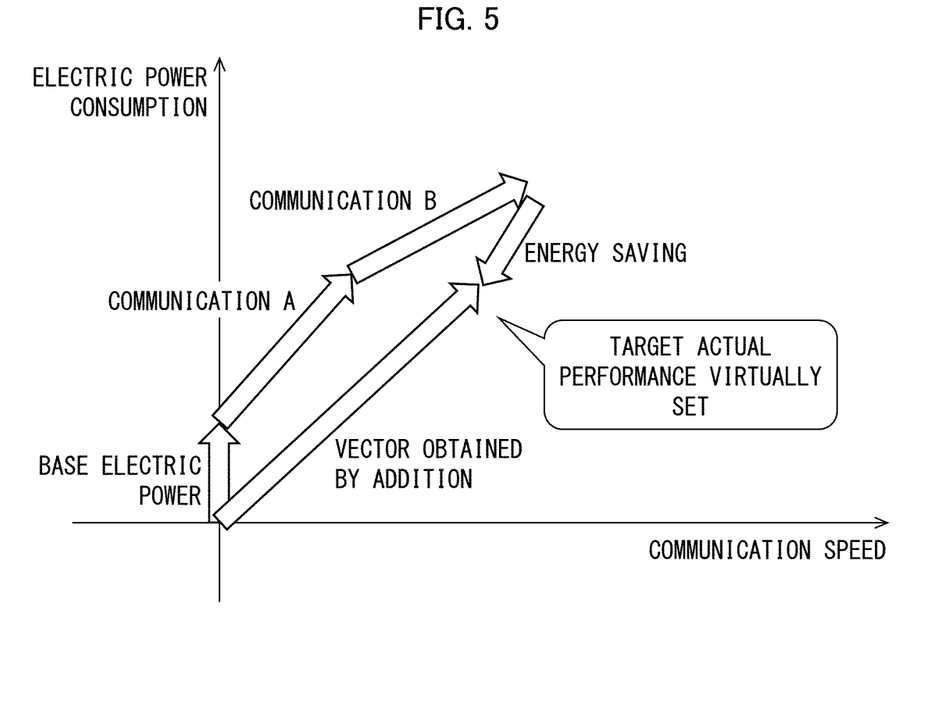
FIG. 5 is a chart illustrating vectors that are constituted by communication speed and electric power consumption.
Figure 6:
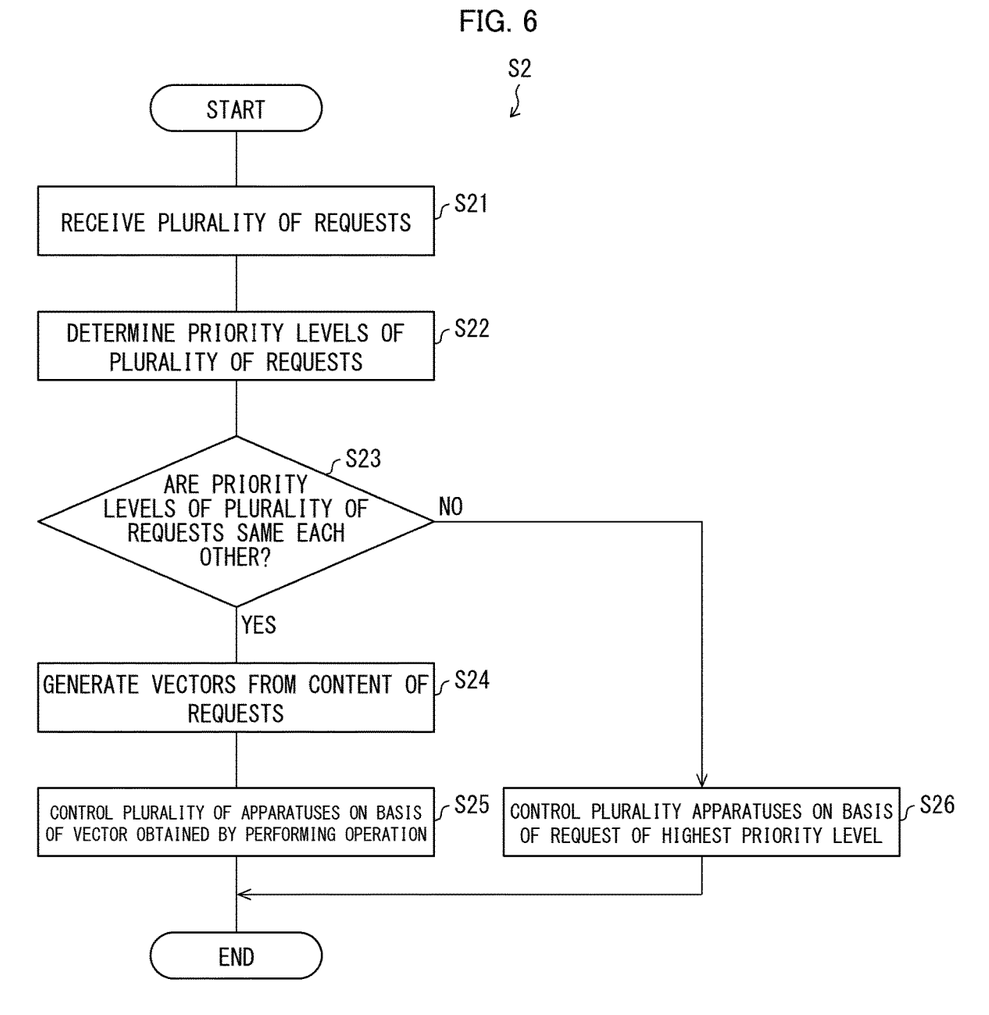
FIG. 6 is a flow chart showing a flow of a method of processing in the operation support apparatus in accordance with the second example embodiment of the present invention.

FIG. 5 is a chart illustrating vectors each constituted by communication speed and electric power consumption. In FIG. 5, as one example of a KPI, a vector constituted by communication speed and electric power consumption that are predetermined indices is shown. Note that the KPI is not limited to this configuration.

The predetermined indices are communication speed and electric power consumption. The control unit 12A generates, from the content of the plurality of requests, respective vectors each constituted by the communication speed and the electric power consumption and performs an operation on the vectors, and controls the plurality of apparatuses on the basis of the vector obtained by performing the operation.

For example, in a case where a request A is an improvement in communication speed due to a concert corresponding to the priority level "1" and an increase of 20 Mbyte/sec is required, the request A corresponds to a vector of "COMMUNICATION A" in FIG. 5. The vector of "COMMUNICATION A" increases in the communication speed and in the electric power consumption.

Further, in a case where a request B is an improvement in communication speed due to a fireworks show corresponding to the priority level "1" and an increase of 20 Mbyte/sec is required, the request B corresponds to a vector of "COMMUNICATION B" in FIG. 5. The vector of "COMMUNICATION B" increases in the communication speed and in the electric power consumption.

On the other hand, assume a case where a request C is related to energy saving due to excessive electric power and corresponds to the priority level "1" (reduction of electric power by 5%). The request C corresponds to a vector of "ENERGY SAVING" in FIG. 5. The vector of "ENERGY SAVING" decreases in the communication speed and in the electric power consumption.

Even in a case where the communication speed is 0, electric power needs to be supplied to the apparatus. When this electric power is defined as a base electric power, a vector that shows a target actual performance virtually set is a vector that is obtained by adding, to a vector of the base electric power, the vector of the "COMMUNICATION A", the vector of "COMMUNICATION B" and the vector of "ENERGY SAVING". Therefore, the control unit 12A controls the plurality of apparatuses so as to obtain the communication speed and the electric power consumption indicated by the vector obtained by such addition.

The control unit 12A puts requests in a time frame of a predetermined interval together, and calculates vectors as described above so as to meet respective target values of the requests. Then, on the basis of a vector obtained as a result of the operation on the vectors, the control unit 12A instructs, for example, a process for adding an apparatus resource.

In this way, although conventionally, it has been necessary to simultaneously process conflicting instructions that include adding an apparatus resource in response to the request A, adding an apparatus resource in response to the request B, and reducing an apparatus resource for energy saving, the control unit 12A can appropriately control each of the apparatuses by controlling the plurality of apparatuses on the basis of the target actual performance obtained by performing the operation on the vectors.

The control unit 12A (a) determines the respective priority levels of the plurality of requests on the basis of the content of the plurality of requests and a plurality of predetermined priority levels, and (b) in a case where the respective priority levels of the plurality of requests are different from each other, carries out control of the plurality of apparatuses on the basis of a request of the highest priority level but does not carry out the control on the basis of a request(s) of a low priority level(s).

For example, in a case where the content of the request relates to a disaster corresponding to the priority level "5", the control unit 12A controls the plurality of apparatuses on the basis of this request of the highest priority level, and does not carry out the control on the basis of another request(s).

Further, in a case where the first request has the content of the request related to a public event/VIP's visit corresponding to the priority level "3" and the second request has the content of the request related to the works corresponding to the priority level "2", the control unit 12A controls the plurality of apparatuses on the basis of the first request and does not carry out the control on the basis of the second request.

<Example Advantage of Operation Support Apparatus 1A>

As described above, according to the operation support apparatus 1A in accordance with the present example embodiment, the control unit 12A (a) determines respective priority levels of the plurality of requests on the basis of the content of the plurality of requests and a plurality of predetermined priority levels, and (b) in a case where the priority levels of the plurality of requests are identical to each other, controls the plurality of apparatuses on the basis of a vector obtained by an operation. Therefore, even in a case where conflicting requests are issued from a plurality of apparatuses that operate according to the automated closed loop control method (i.e., a conflict occurs), the control unit 12A can appropriately control each of the apparatuses.

Further, the control unit 12A generates, from the content of the plurality of requests, respective vectors each constituted by the communication speed and the electric power consumption, and performs an operation on the vectors, and controls the plurality of apparatuses on the basis of a vector obtained by performing the operation. Therefore, even in a case where conflicting requests are issued from a plurality of apparatuses that operate according to the automated closed loop control method (i.e., a conflict occurs), the control unit 12A can appropriately control each of the apparatuses.

In addition, the control unit 12A (a) determines the respective priority levels of the plurality of requests on the basis of the content of the plurality of requests and the plurality of predetermined priority levels, and (b) in a case where the respective priority levels of the plurality of requests are different from each other, carries out control of the plurality of apparatuses on the basis of a request of the highest priority level but does not carry out the control on the basis of a request(s) of a low priority level(s). Therefore, the control unit 12A can appropriately control each of the apparatuses in accordance with the priority level.

Software Implementation Example

The functions of part of or all of the operation support apparatus 1, 1A and the operation support system 100, 100A can be realized by hardware such as an integrated circuit (IC chip) or can be alternatively realized by software.

Figure 7:
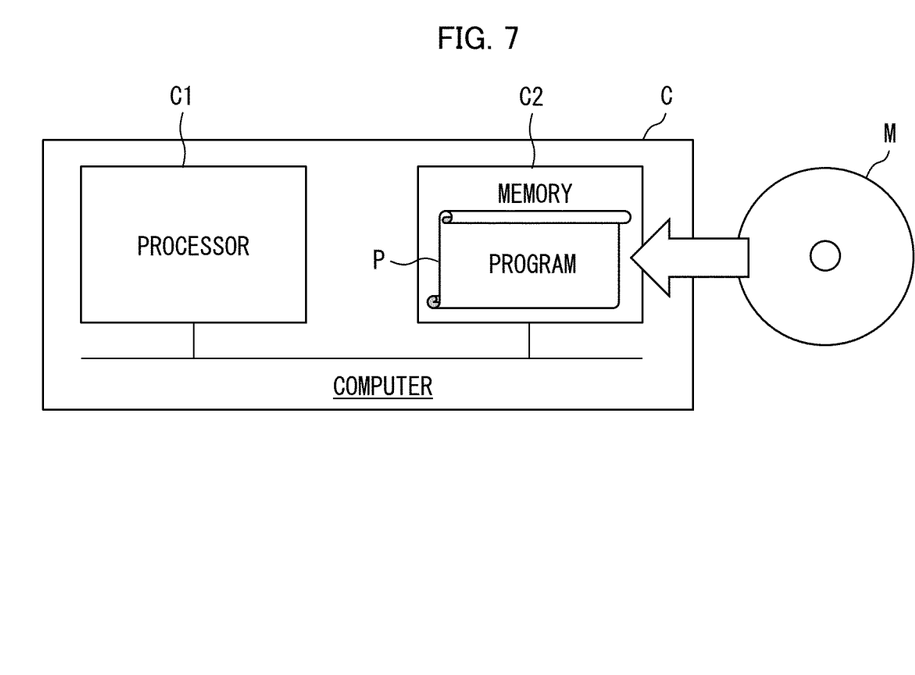
FIG. 7 is a block diagram illustrating a configuration example of a computer that functions as each of the operation support apparatus and the operation support system in accordance with respective example embodiments.

In the latter case, each of the operation support apparatus 1, 1A and the operation support system 100, 100A is realized by, for example, a computer that executes instructions of a program that is software realizing the foregoing functions. FIG. 7 illustrates an example of such a computer (hereinafter referred to as "computer C"). The computer C includes at least one processor C1 and at least one memory C2. The memory C2 stores a program P for causing the computer C to function as the operation support apparatus 1, 1A and the operation support system 100, 100A. In the computer C, the processor C1 reads the program P from the memory C2 and executes the program P, so that the functions of the operation support apparatus 1, 1A and the operation support system 100, 100A are realized.

Examples of the processor C1 encompass a central processing unit (CPU), a graphic processing unit (GPU), a digital signal processor (DSP), a micro processing unit (MPU), a floating point number processing unit (FPU), a physics processing unit (PPU), a microcontroller or a combination thereof. The memory C2 may be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface for transmitting and receiving data to and from another apparatus. The computer C may further include an input/output interface for connecting the computer C to an input/output apparatus(es) such as a keyboard, a mouse, a display, and/or a printer.

The program P can also be stored in a non-transitory tangible storage medium M from which the computer C can read the program P. Such a storage medium M may be, for example, a tape, a disk, a card, a semiconductor memory, a programmable logic circuit, or the like. The computer C can acquire the program P via the storage medium M. The program P can also be transmitted via a transmission medium. The transmission medium may be, for example, a communication network, a broadcast wave, or the like. The computer C can acquire the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

The whole or part of the example embodiments disclosed above can also be described as below. Note, however, that the present invention is not limited to the following example aspects.

(Supplementary Note 1)

An operation support apparatus which supports operations of a plurality of apparatuses that constitute a domain of a network and that operate according to an automated closed loop control method, the operation support apparatus including:
  a reception means for receiving a plurality of requests from one or more apparatuses among the plurality of apparatuses; and
  a control means for (i) generating, from content of the plurality of requests, respective vectors each constituted by predetermined indices, and performing an operation on the vectors, and (ii) controlling the plurality of apparatuses on the basis of a vector obtained by performing the operation.

The above configuration makes it possible to appropriately control each of a plurality of apparatuses that operate according to an automated closed loop control method even in a case where conflicting requests are issued by the apparatuses.

(Supplementary Note 2)

The operation support apparatus according to supplementary note 1, wherein the control means (a) determines respective priority levels of the plurality of requests on the basis of the content of the plurality of requests and a plurality of predetermined priority levels, and (b) in a case where the priority levels of the plurality of requests are identical to each other, controls the plurality of apparatuses on the basis of the vector obtained by performing the operation.

(Supplementary Note 3)

The operation support apparatus according to supplementary note 1 or 2, wherein in a case where content of a first request and content of a second request are conflicting with each other, the control means generates a first vector from the content of the first request, generates a second vector from the content of the second request, adds up the first vector and the second vector, and controls the plurality of apparatuses on the basis of a vector obtained by adding up the first vector and the second vector.

(Supplementary Note 4)

The operation support apparatus according to supplementary note 1 or 2, wherein:
  the predetermined indices are communication speed and electric power consumption; and
  the control means generates, from the content of the plurality of requests, vectors each constituted by the communication speed and the electric power consumption and performs an operation on the vectors, and controls the plurality of apparatuses on the basis of a vector obtained by performing the operation.

(Supplementary Note 5)

The operation support apparatus according to any one of supplementary notes 1 to 4, wherein the control means (a) determines the respective priority levels of the plurality of requests on the basis of the content of the plurality of requests and a plurality of predetermined priority levels, and (b) in a case where the respective priority levels of the plurality of requests are different from each other, carries out control of the plurality of apparatuses on the basis of a request of a highest priority level but does not carry out the control on the basis of a request of a low priority level.

According to The above configuration, the control means can appropriately control each of the apparatuses in accordance with the priority level.

(Supplementary Note 6)

An operation support system including:
  a plurality of apparatuses which constitute a domain of a network and which operate according to an automated closed loop control method; and
  an operation support apparatus which supports the plurality of apparatuses,
  the operation support apparatus including:
    a reception means for receiving a plurality of requests from one or more apparatuses among the plurality of apparatuses; and a control means for (i) generating, from content of the plurality of requests, respective vectors each constituted by predetermined indices, and performing an operation on the vectors, and (ii) controlling the plurality of apparatuses on the basis of a vector obtained by performing the operation.

The above configuration makes it possible to appropriately control each of a plurality of apparatuses that operate according to an automated closed loop control method even in a case where conflicting requests are issued by the apparatuses.

(Supplementary Note 7)

The operation support system according to supplementary note 6, wherein the control means (a) determines respective priority levels of the plurality of requests on the basis of the content of the plurality of requests and a plurality of predetermined priority levels, and (b) in a case where the priority levels of the plurality of requests are identical to each other, controls the plurality of apparatuses on the basis of the vector obtained by performing the operation.

(Supplementary Note 8)

An operation support method for supporting operations of a plurality of apparatuses which constitute a domain of a network and which operate according to an automated closed loop control method, the operation support method including:

receiving a plurality of requests from one or more apparatuses among the plurality of apparatuses;

generating, from content of the plurality of requests, respective vectors each constituted by predetermined indices, and performing an operation on the vectors; and controlling the plurality of apparatuses on the basis of a vector obtained by performing the operation.

The above configuration makes it possible to appropriately control each of a plurality of apparatuses that operate according to an automated closed loop control method even in a case where conflicting requests are issued by the apparatuses.

(Supplementary Note 9)

The operation support method according to supplementary note 8, wherein in a process of controlling the plurality of apparatuses, (a) respective priority levels of the plurality of requests are determined on the basis of the content of the plurality of requests and a plurality of predetermined priority levels, and (b) in a case where the priority levels of the plurality of requests are identical to each other, the plurality of apparatuses are controlled on the basis of the vector obtained by performing the operation.

(Supplementary Note 10)

An operation support apparatus which supports operations of a plurality of apparatuses that constitute a domain of a network and that operate according to an automated closed loop control method, the operation support apparatus including at least one processor, the processor carrying out:

a process of receiving a plurality of requests from one or more apparatuses among the plurality of apparatuses;

a process of generating, from content of the plurality of requests, respective vectors each constituted by predetermined indices, and performing an operation on the vectors; and a process of controlling the plurality of apparatuses on the basis of a vector obtained by performing the operation.

Note that the operation support apparatus can further include a memory. In the memory, a program for causing the processor to carry out the process of receiving, the process of performing the operation, and the process of controlling. The program may be stored in a computer-readable non-transitory tangible storage medium.

(Supplementary Note 11)

An operation support system including:

a plurality of apparatuses which constitute a domain of a network and which operate according to an automated closed loop control method; and an operation support apparatus which supports the plurality of apparatuses, the operation support system including at least one processor, the processor carrying out:

a process of receiving a plurality of requests from one or more apparatuses among the plurality of apparatuses;

a process of generating, from content of the plurality of requests, respective vectors each constituted by predetermined indices, and performing an operation on the vectors; and a process of controlling the plurality of apparatuses on the basis of a vector obtained by performing the operation.

Note that the operation support system can further include a memory. In the memory, a program for causing the processor to carry out the process of receiving, the process of performing the operation, and the process of controlling. The program may be stored in a computer-readable non-transitory tangible storage medium.

REFERENCE SIGNS LIST 1, 1A operation support apparatus
2 RAN
3 TN
4 CN
11 reception unit
12, 12A control unit
21 BSS
22 E2E orchestrator
23 RAN domain
24 TN domain
25 CN domain
31 RAN orchestrator
32 non real-time RIC
33 near real-time RIC
34 CU
35 DU
36 RU
37 NFVI
38 MEAO
39 MEP
40 MEPM-V
41 MEC App
42 VIM
221 CSMF
222 NSMF
242, 252, 311 NSSMF
243 SDNC
244 WAN
251 core orchestrator
253 EM
254 VNF
255 NFVO

256 NFVI
257 VNFM
258 VIM

The invention claimed is:

1. An operation support apparatus which supports operations of a plurality of apparatuses that constitute a domain of a network and that operate according to an automated closed loop control method,
the operation support apparatus comprising at least one processor,
the at least one processor carrying out:
a process of receiving a plurality of requests from one or more apparatuses among the plurality of apparatuses; and
a process of (i) generating, from content of the plurality of requests, respective vectors each constituted by predetermined indices, and performing an operation on the vectors, and (ii) controlling the plurality of apparatuses on the basis of a vector obtained by performing the operation.

2. The operation support apparatus according to claim 1, wherein in the process of controlling, the at least one processor (a) determines respective priority levels of the plurality of requests on the basis of the content of the plurality of requests and a plurality of predetermined priority levels, and (b) in a case where the priority levels of the plurality of requests are identical to each other, controls the plurality of apparatuses on the basis of the vector obtained by performing the operation.

3. The operation support apparatus according to claim 1, wherein in the process of controlling, in a case where content of a first request and content of a second request are conflicting with each other, the at least one processor generates a first vector from the content of the first request, generates a second vector from the content of the second request, adds up the first vector and the second vector, and controls the plurality of apparatuses on the basis of a vector obtained by adding up the first vector and the second vector.

4. The operation support apparatus according to claim 1, wherein:
the predetermined indices are communication speed and electric power consumption; and
in the process of controlling, the at least one processor generates, from the content of the plurality of requests, vectors each constituted by the communication speed and the electric power consumption and performs an operation on the vectors, and controls the plurality of apparatuses on the basis of a vector obtained by performing the operation.

5. The operation support apparatus according to claim 1, wherein in the process of controlling, the at least one processor (a) determines the respective priority levels of the plurality of requests on the basis of the content of the plurality of requests and a plurality of predetermined priority levels, and (b) in a case where the respective priority levels of the plurality of requests are different from each other, carries out control of the plurality of apparatuses on the basis of a request of a highest priority level but does not carry out the control on the basis of a request of a low priority level.

6. An operation support system comprising:
a plurality of apparatuses which constitute a domain of a network and which operate according to an automated closed loop control method; and
an operation support apparatus which supports the plurality of apparatuses,
the operation support apparatus including at least one processor,
the at least one processor carrying out:
a process of receiving a plurality of requests from one or more apparatuses among the plurality of apparatuses; and
a process of (i) generating, from content of the plurality of requests, respective vectors each constituted by predetermined indices, and performing an operation on the vectors, and (ii) controlling the plurality of apparatuses on the basis of a vector obtained by performing the operation.

7. The operation support system according to claim 6, wherein in the process of controlling, the at least one processor (a) determines respective priority levels of the plurality of requests on the basis of the content of the plurality of requests and a plurality of predetermined priority levels, and (b) in a case where the priority levels of the plurality of requests are identical to each other, controls the plurality of apparatuses on the basis of the vector obtained by performing the operation.

8. The operation support system according to claim 6, wherein in the process of controlling, in a case where content of a first request and content of a second request are conflicting with each other, the at least one processor generates a first vector from the content of the first request, generates a second vector from the content of the second request, adds up the first vector and the second vector, and controls the plurality of apparatuses on the basis of a vector obtained by adding up the first vector and the second vector.

9. The operation support system according to claim 6, wherein:
the predetermined indices are communication speed and electric power consumption; and
in the process of controlling, the at least one processor generates, from the content of the plurality of requests, vectors each constituted by the communication speed and the electric power consumption and performs an operation on the vectors, and controls the plurality of apparatuses on the basis of a vector obtained by performing the operation.

10. The operation support system according to claim 6, wherein in the process of controlling, the at least one processor (a) determines the respective priority levels of the plurality of requests on the basis of the content of the plurality of requests and a plurality of predetermined priority levels, and (b) in a case where the respective priority levels of the plurality of requests are different from each other, carries out control of the plurality of apparatuses on the basis of a request of a highest priority level but does not carry out the control on the basis of a request of a low priority level.

11. An operation support method for supporting operations of a plurality of apparatuses which constitute a domain of a network and which operate according to an automated closed loop control method, the operation support method comprising:
receiving a plurality of requests from one or more apparatuses among the plurality of apparatuses;
generating, from content of the plurality of requests, respective vectors each constituted by predetermined indices, and performing an operation on the vectors; and
controlling the plurality of apparatuses on the basis of a vector obtained by performing the operation.

12. The operation support method according to claim 11, wherein in controlling the plurality of apparatuses, (a) respective priority levels of the plurality of requests are determined on the basis of the content of the plurality of requests and a plurality of predetermined priority levels, and (b) in a case where the priority levels of the plurality of requests are identical to each other, the plurality of apparatuses are controlled on the basis of the vector obtained by performing the operation.

13. The operation support method according to claim 11, wherein in the controlling, in a case where content of a first request and content of a second request are conflicting with each other, a first vector is generated from the content of the first request, a second vector is generated from the content of the second request, the first vector and the second vector are added up, and the plurality of apparatuses are controlled on the basis of a vector obtained by adding up the first vector and the second vector.

14. The operation support method according to claim 11, wherein:

the predetermined indices are communication speed and electric power consumption; and in the controlling, vectors each constituted by the communication speed and the electric power consumption are generated from the content of the plurality of requests, and an operation on the vectors is performed, and the plurality of apparatuses are controlled on the basis of a vector obtained by performing the operation.

15. The operation support method according to claim 11, wherein in the controlling, (a) the respective priority levels of the plurality of requests are determined on the basis of the content of the plurality of requests and a plurality of predetermined priority levels, and (b) in a case where the respective priority levels of the plurality of requests are different from each other, control of the plurality of apparatuses is carried out on the basis of a request of a highest priority level but the control is not carried out on the basis of a request of a low priority level.

* * * * *